United States Patent
Hwang et al.

(10) Patent No.: US 9,201,271 B2
(45) Date of Patent: Dec. 1, 2015

(54) LIQUID CRYSTAL ALIGNMENT LAYER AND LIQUID CRYSTAL CELL COMPRISING THE SAME

(71) Applicant: LG CHEM, LTD., Seoul (KR)

(72) Inventors: Seung-Yeon Hwang, Chungcheongnam-do (KR); Sung-Ho Chun, Daejeon (KR); Dong-Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 216 days.

(21) Appl. No.: 13/966,908

(22) Filed: Aug. 14, 2013

(65) Prior Publication Data

US 2014/0049739 A1    Feb. 20, 2014

(30) Foreign Application Priority Data

Aug. 20, 2012 (KR) .......... 10-2012-0090743
Aug. 14, 2013 (KR) .......... 10-2013-0096425

(51) Int. Cl.
*G02F 1/1337* (2006.01)
*C09K 19/38* (2006.01)
*C09K 19/56* (2006.01)
*C09K 19/04* (2006.01)

(52) U.S. Cl.
CPC .... *G02F 1/133711* (2013.01); *G02F 1/133788* (2013.01); *C09K 19/38* (2013.01); *C09K 19/56* (2013.01); *C09K 2019/0448* (2013.01); *G02F 2001/133726* (2013.01)

(58) Field of Classification Search
CPC .......... C09K 19/38; C09K 19/56; C09K 2019/0448; G02F 1/133711; G02F 1/133788; G02F 2001/133726; Y10T 428/1005
See application file for complete search history.

(56) References Cited

U.S. PATENT DOCUMENTS

2010/0068419 A1*  3/2010  Kim et al. ............... 428/1.23
2011/0213048 A1*  9/2011  Yoo et al. ................ 522/112
2012/0021141 A1*  1/2012  Yoo et al. ................ 428/1.2

FOREIGN PATENT DOCUMENTS

| JP | 2010-256732 A | 11/2010 |
| JP | 2012-027471 A | 2/2012 |
| KR | 10-2007-0029100 A | 3/2007 |
| KR | 10-2010-0084823 A | 7/2010 |
| KR | 10-2012-0011796 A | 2/2012 |
| WO | 2011/115338 A1 | 9/2011 |

* cited by examiner

*Primary Examiner* — Shean C Wu
(74) *Attorney, Agent, or Firm* — Dentons US LLP (57) ABSTRACT

The present invention relates to a photoalignment layer, for example, a liquid crystal alignment layer, which is able to realize the wide viewing angle and contrast ratio characteristics of a photopolymerizable alignment layer, and to facilitate interaction with the liquid crystal layer, thereby improving alignment stability and reducing image sticking, and a liquid crystal cell including the same. The liquid crystal alignment layer includes a photo-alignment layer including a photo-alignment polymer having at least partially photo-aligned photoreactive groups; and a mesogen layer including a cured product of a reactive mesogen that is liquid crystal-aligned by the photo-aligned photoreactive group, in which the photo-alignment polymer include a norbornene-based polymer having a particular structure.

14 Claims, 2 Drawing Sheets

LIQUID CRYSTAL ALIGNMENT LAYER AND LIQUID CRYSTAL CELL COMPRISING THE SAME

FIELD OF THE INVENTION

The present invention relates to a liquid crystal alignment layer and a liquid crystal cell including the same. More particularly, the present invention relates to a photoalignment layer, for example, a liquid crystal alignment layer, which is able to realize the wide viewing angle and contrast ratio characteristics of a photopolymerizable alignment layer, to improve alignment stability of liquid crystals and to reduce image sticking, and a liquid crystal cell including the same.

DESCRIPTION OF THE RELATED ART

In recent years, as a liquid crystal display has become bigger, its application has been expanded from personal use such as mobile phones or notebook computers to home use such as wall-mountable television sets, etc. and thus it is required to ensure the high definition, the high quality, and the wide viewing angle in respect to the liquid crystal display. In particular, since individual pixels operate independently, thin film transistor-liquid crystal displays (TFT-LCD) driven by a thin film transistor exhibit a very fast response time of liquid crystals, and thus make it possible to realize a high definition dynamic image and are gradually expanding boundaries of their application.

In order to use liquid crystals as an optical switch in TFT-LCDs, liquid crystals need to be initially aligned in a predetermined direction on a thin film transistor layer which is disposed in the most inner portion of a display cell. For this purpose, a liquid crystal alignment layer is used. Conventionally, a rubbing process has been mainly used for aligning liquid crystals. In the rubbing process, grooves are formed on the surface of the liquid crystal alignment layer in a predetermined direction by rubbing the surface of the liquid crystal alignment layer in the predetermined direction using a rubbing cloth with fine projections. Liquid crystals are aligned along the grooves thus formed.

However, this rubbing process may (1) generate static charges between the rubbing cloth and a thin film transistor (TFT) or a color filter (CF) substrate to damage TFT. In addition, (2) the grooves are not easily formed in the pixel area having a complex structure because of its step height, resulting in poor alignment of liquid crystals. (3) Screen quality may be deteriorated by particles or dust generated from the rubbing cloth. Additionally, (4) the rubbing process cannot form multi domains where liquid crystals are aligned on one substrate in different directions.

In order to overcome these drawbacks, recent studies have been widely conducted to apply a photoalignment method which is a light (e.g., UV)-induced alignment of liquid crystals. For photoalignment, typically, an alignment layer including a photo-alignment (photoreactive) polymer is formed on the lower surface of the liquid crystal layer, and a photoreaction is generated by irradiation of the alignment layer with linearly polarized UV light. As a result, a photoalignment occurs, that is, the main chains of the photo-alignment polymer are unidirectionally aligned, and thus liquid crystals included in the liquid crystal layer can be aligned due to the effect of the alignment layer thus photoaligned.

However, when this photopolymerizable liquid crystal alignment layer is applied to the liquid crystal alignment layer of a TFT-CELL, it is possible to realize excellent liquid crystal alignment property and alignment speed, and also to improve the contrast ratio of a liquid crystal display device, etc. However, despite these advantages in application of the photopolymerizable liquid crystal alignment layer, problems of low alignment stability of liquid crystals or image sticking may be caused by the photoreactive groups of the photo-alignment polymer that do not undergo photoreaction and photoalignment, instability of the main chains, low interaction (low anchoring energy) with the liquid crystal layer, or the like.

SUMMARY OF THE INVENTION

Accordingly, the present invention provides a liquid crystal alignment layer which is able to realize the wide viewing angle and contrast ratio characteristics of a photopolymerizable alignment layer, and to facilitate an interaction with a liquid crystal layer, thereby improving alignment stability and reducing image sticking.

Further, the present invention provides a liquid crystal cell including the liquid crystal alignment layer.

DETAILED DESCRIPTION OF THE PREFERRED EMBODIMENTS

The present invention provides a liquid crystal alignment layer, including a photo-alignment layer including a photo-alignment polymer having at least partially photo-aligned photoreactive groups; and a mesogen layer including a cured product of a reactive mesogen that is liquid crystal-aligned by the photo-aligned photoreactive group, in which the photo-alignment polymer includes a norbornene-based polymer having a repeating unit of the following Chemical Formula 3a or 3b:

[Chemical Formula 3a]

[Chemical Formula 3b]

wherein each independently, q is an integer of 0 to 4, and m is 50 to 5000, and at least one of R1, R2, R3, and R4 is a radical of the following Chemical Formula 1a, and R1 to R4 other than those being the radical of Chemical Formula 1a are the same as or different from each other, and each independently selected from the group consisting of hydrogen; halogen; substituted or unsubstituted, linear or branched alkyl having 1 to 20 carbon atoms; substituted or unsubstituted, linear or branched alkenyl having 2 to 20 carbon atoms; substituted or unsubstituted, linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group containing at least one selected from oxygen, nitrogen, phosphorous, sulfur, silicon and boron, if R1 to R4 are not hydrogen; halogen; or a polar functional group, one or more combinations selected from the group consisting of R1 and R2, and R3 and R4 are optionally linked to each other to form an alkylidene group having 1 to 10 carbon atoms, or R1 or R2 is optionally linked to any one of R3 and R4 to form a saturated or unsaturated aliphatic ring having 4 to 12 carbon atoms or an aromatic ring having 6 to 24 carbon atoms,

[Chemical Formula 1a]

wherein A is a simple bond, oxygen, sulfur, or —NH—,

B is selected from the group consisting of a simple bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms, R9 is selected from the group consisting of a simple bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms, and

R10 to R14 are the same as or different from each other, and each independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, substituted or unsubstituted alkoxyaryl having 6 to 40 carbon atoms, and hetero aryl having 6 to 40 carbon atoms containing a hetero element of Group 14, 15 or 16.

Further, in the liquid crystal alignment layer, the reactive mesogen may be a compound having a mesogenic group and a photo-polymerizable or photo-curable functional group at at least one end thereof, and example thereof may include a compound of the following Chemical Formula 4 or 5:

[Chemical Formula 4]

[Chemical Formula 5]

wherein L1 and L2 are each independently selected from the group consisting of hydrogen, halogen, substituted or unsubstituted alkyl having 1 to 20 carbon atoms, substituted or unsubstituted alkyl ester having 1 to 8 carbon atoms, substituted or unsubstituted alkyl ether having 1 to 8 carbon atoms, and substituted or unsubstituted alkyl ketone having 1 to 8 carbon atoms, $B_1$ and $B_2$ are each independently substituted or unsubstituted arylene having 6 to 20 carbon atoms, or substituted or unsubstituted cycloalkylene having 4 to 8 carbon atoms, R1 and R2 are each independently a (meth)acryl group or an epoxy group, $X_1$ is selected from the group consisting of fluorine-substituted or unsubstituted alkyl having 1 to 7 carbon atoms, fluorine-substituted or unsubstituted alkoxy having 1 to 7 carbon atoms, fluorine-substituted or unsubstituted alkenyl having 2 to 7 carbon atoms, fluorine-substituted or unsubstituted alkenyloxy having 2 to 7 carbon atoms, and fluorine-substituted or unsubstituted alkoxyalkyl having 1 to 7 carbon atoms, and $Z_1$, $Z_2$, $Z_3$, and $Z_4$ are each independently a simple bond, —O—, —S—, —COO— or —OCO—.

Further, the present invention provides a liquid crystal cell including the liquid crystal alignment layer.

Hereinafter, a liquid crystal alignment layer and a liquid crystal cell according to embodiments of the present invention will be described.

Unless otherwise particularly mentioned, several terms as used herein are defined as follows.

The phrase "a certain substance, polymer or functional group is able to show "photo-alignment property" or "photo-reactivity"" means that the corresponding substance, polymer or functional group (photoreactive group) are deployed or aligned according to a predetermined polarization direction by irradiation of linearly polarized light, e.g., linearly polarized UV, thereby causing alignment of the liquid crystal compound (e.g., the reactive mesogen in the mesogen layer or the TFT-CELL liquid crystal molecule in the liquid crystal layer) or orientation of liquid crystals.

As used herein, the term "reactive mesogen (RM)" refers to a material that contains a polymerizable, cross-linkable, or curable unsaturated group in the molecule and thus can be polymerized, cross-linked, or cured by photo-irradiation such as UV irradiation, and also contains one or more mesogenic groups to show liquid crystal phase behavior. The mesogenic group may be any mesogenic functional group contained in the previously known liquid crystal compound, and the scope or type thereof are widely known to those skilled in the art.

The term "(photo)cured product" or "(photo)cured" encompasses that a component having curable or cross-linkable unsaturated groups in its chemical structure are entirely cured, cross-linked, or polymerized, as well as partially cured, cross-linked, or polymerized. For example, in the cured product of the "(photo)cured" reactive mesogen, all of the unsaturated groups contained in the reactive mesogen may be cured, cross-linked, or polymerized, but approxi- mately 50% or more, approximately 60% or more, or approximately 70% or more thereof may be cured, cross-linked, or polymerized.

Meanwhile, according to one embodiment of the present invention, provided is a liquid crystal alignment layer, including a photo-alignment layer including a photo-alignment polymer having at least partially photo-aligned photoreactive group; and a mesogen layer including a cured product of a reactive mesogen that is liquid crystal-aligned by the photo-aligned photoreactive group, in which the photo-alignment polymer includes a norbornene-based polymer having a repeating unit of the following Chemical Formula 3a or 3b:

[Chemical Formula 3a]

[Chemical Formula 3b]

wherein each independently, q is an integer of 0 to 4, and m is 50 to 5000, and at least one of R1, R2, R3, and R4 is a radical of the following Chemical Formula 1a, R1 to R4 other than those being the radical of Chemical Formula 1a are the same as or different from each other, and each independently selected from the group consisting of hydrogen; halogen; substituted or unsubstituted, linear or branched alkyl having 1 to 20 carbon atoms; substituted or unsubstituted, linear or branched alkenyl having 2 to 20 carbon atoms; substituted or unsubstituted, linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group containing at least one selected from oxygen, nitrogen, phosphorous, sulfur, silicon and boron, if R1 to R4 are not hydrogen; halogen; or a polar functional group, one or more combinations selected from the group consisting of R1 and R2, and R3 and R4 are optionally linked to each other to form an alkylidene group having 1 to 10 carbon atoms, or R1 or R2 is optionally linked to any one of R3 and R4 to form a saturated or unsaturated aliphatic ring having 4 to 12 carbon atoms or an aromatic ring having 6 to 24 carbon atoms,

[Chemical Formula 1a]

wherein A is a simple bond, oxygen, sulfur, or —NH—,

B is selected from the group consisting of a simple bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms, R9 is selected from the group consisting of a simple bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms, and R10 to R14 are the same as or different from each other, and each independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, substituted or unsubstituted alkoxyaryl having 6 to 40 carbon atoms, and hetero aryl having 6 to 40 carbon atoms containing a hetero element of Group 14, 15 or 16.

In the case of the previously known photopolymerizable liquid crystal alignment layer, the alignment layer including the photo-alignment polymer is mainly formed as a single layer, and a liquid crystal layer of TFT-CELL is formed on the alignment layer of the liquid crystal alignment layer. In the conventional photopolymerizable liquid crystal alignment layer, a method of at least partially photo-aligning the photoreactive group of the photo-alignment polymer, photo-curing the alignment layer including the same, and then liquid crystal-aligning TFT-CELL liquid crystal molecules of the liquid crystal layer by the photo-aligned photoreactive group has been applied.

However, this conventional photopolymerizable liquid crystal alignment layer has the problems of low alignment stability of liquid crystals and image sticking that are caused by the photoreactive groups of the photo-alignment polymer that do not undergo photoalignment, instability of main chain, low interaction (low anchoring energy) with the liquid crystal layer, or the like.

Unlike the conventional liquid crystal alignment layer, the mesogen layer including the reactive mesogen is separately formed on the photo-alignment layer including the photo-alignment polymer in the liquid crystal alignment layer of one embodiment. When the liquid crystal alignment layer of one embodiment is applied, the photoreactive group of the photo-alignment polymer is at least partially photo-aligned, and the alignment layer including the same is photo-cured, and then the reactive mesogen of the mesogen layer is liquid crystal-aligned and photo-cured by the photo-aligned photoreactive group. In other words, in the liquid crystal alignment layer of one embodiment, the liquid crystal layer of TFT-CELL is formed on the mesogen layer other than the photo-alignment layer, and TFT-CELL liquid crystal molecules of the liquid crystal layer can be liquid crystal-aligned by using the liquid crystal-aligned reactive mesogen of the mesogen layer.

The experimental results of the present inventors showed that when the liquid crystal layer is aligned in such a manner by applying the liquid crystal alignment layer of one embodiment, interaction (anchoring energy) between the reactive mesogen of the mesogen layer and the liquid crystal molecules of the liquid crystal layer can be more improved, and interaction between the liquid crystal molecules of TFT-CELL is more increased to reduce image sticking due to electrical stress. In addition, the liquid crystal alignment layer of one embodiment, which includes the photo-alignment layer and the mesogen layer at the same time, is able to exhibit more enhanced alignment stability and excellent liquid crystal alignment and alignment speed characteristics of the photopolymerizable liquid crystal alignment layer, and furthermore, to maintain excellent contrast ratio of a liquid crystal display device, etc. and to realize wide viewing angle due to multidirectional pattern of the liquid crystals.

In particular, since the liquid crystal alignment layer of one embodiment includes the particular norbornene-based polymer of the above described Chemical Formula 3a or 3b as the photo-alignment polymer in the photo-alignment layer, the reactive mesogen of the mesogen layer can be more effectively liquid crystal-aligned and photo-cured. Consequently, interaction (anchoring energy) between the reactive mesogen of the mesogen layer and the liquid crystal molecules of the liquid crystal layer can be more improved, image sticking due to electrical stress can be more reduced, and the excellent contrast ratio of the liquid crystal display device can be obtained.

Accordingly, the liquid crystal alignment layer of one embodiment can be very preferably applied as the liquid crystal alignment layer of TFT-CELL or the like, because advantages of the previously known photopolymerizable liquid crystal alignment layer can be strengthened and disadvantages of image sticking or low alignment stability can be solved.

Hereinafter, the liquid crystal alignment layer of one embodiment and the manufacturing method thereof will be described in more detail.

In the liquid crystal alignment layer of one embodiment, a norbornene-based polymer including a repeating unit of Chemical Formula 3a or 3b having a photoreactive group that is a radical of Chemical Formula 1a may be used as the photo-alignment polymer.

Because this norbornene-based polymer has the radical of Chemical Formula 1a as the photoreactive group, it exhibits excellent photo-reactivity, photo-alignment property, and photo-reaction rate, and the reactive mesogen of the mesogen layer can be more effectively liquid crystal-aligned. More particularly, because the radical of Chemical Formula 1a is a cinnamate-based photoreactive group, the photo-alignment polymer having the same is able to exhibit excellent photo-alignment property and liquid crystal alignment property, and excellent interaction with the reactive mesogen and alignment stability.

Specifically, in terms of excellent alignment property or the like, one or more halogen elements such as fluorine or bulky functional groups such as aryl, aryloxy or alkoxyaryl can be substituted at the end of the photoreactive group. When a halogen element or a bulky functional group is substituted at the end of the cinnamate-based photoreactive group, degree of freedom or free space between the photoreactive groups can be secured, thereby facilitating the photo-reaction such dimerization or isomerization. Consequently, the photo-alignment polymer shows more excellent photo-reactivity, photo-alignment property or the like. In addition, in terms of coating property of the composition for forming the liquid crystal alignment layer, the end of the photoreactive group can be substituted with one or more alkyl, alkoxy or aryloxy.

Accordingly, in the photoreactive group of Chemical Formula 1a, one or more of R10 to R14 are more preferably halogen, substituted or unsubstituted alkoxy having 1 to 20 carbon atoms, substituted or unsubstituted aryloxy having 6 to 30 carbon atoms, substituted or unsubstituted aryl having 6 to 40 carbon atoms, substituted or unsubstituted alkoxyaryl having 6 to 40 carbon atoms, or halogen-subsisted or unsubstituted alkyl having 1 to 20 carbon atoms.

Further, the photo-alignment polymer having the photoreactive group may include a cyclic olefin-based repeating unit of Chemical Formula 3a or 3b, and has a structure in which one or more of the above described photoreactive groups are bound to the repeating unit. Owing to the repeating unit structure of the photo-alignment polymer, thermal stability or alignment stability of the photo-alignment polymer and the photo-alignment layer can be more improved, and as a result, entire characteristics of the liquid crystal alignment layer can be also more improved.

The above described photo-alignment polymers may be, for example, the photo-reactive polymers described in Korean Patent Nos. 0789247, 0671753 or 0982394, or WO 2012-0044883 or WO 2012-0031912, and may be prepared according to the method described in the above documents.

Meanwhile, in the above described photo-alignment polymer, the polar functional group to be substituted in R1 to R4, that is, the polar functional group including one or more selected from oxygen, nitrogen, phosphorous, sulfur, silicon, and boron may be selected from the following functional groups, and may be also various other polar functional groups including one or more selected from oxygen, nitrogen, phosphorous, sulfur, silicon and boron:

—OR$_6$, —OC(O)OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_5$O)$_p$—OR$_6$, —(OR$_5$)$_p$—OR$_6$, —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$—, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$, wherein p is each independently an integer of 1 to 10, R5 is substituted or unsubstituted, linear or branched alkylene having 1 to 20 carbon atoms; substituted or unsubstituted, linear or branched alkenylene having 2 to 20 carbon atoms; unsubstituted, linear or branched alkynylene having 2 to 20 carbon atoms; substituted or unsubstituted cycloalkylene having 3 to 12 carbon atoms; substituted or unsubstituted arylene having 6 to 40 carbon atoms; substituted or unsubstituted carbonyloxylene having 1 to 20 carbon atoms; or substituted or unsubstituted alkoxylene having 1 to 20 carbon atoms, R6, R7 and R8 are each independently selected from the group consisting of hydrogen; halogen; substituted or unsubstituted, linear or branched alkyl having 1 to 20 carbon atoms; substituted or unsubstituted, linear or branched alkenyl having 2 to 20 carbon atoms; substituted or unsubstituted, linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted alkoxy having 1 to 20 carbon atoms; and substituted or unsubstituted carbonyloxy having 1 to 20 carbon atoms.

Further, in the photo-alignment polymer, the substituted or unsubstituted aryl having 6 to 40 carbon atoms; or hetero aryl having 6 to 40 carbon atoms containing a hetero element of Group 14, 15 or 16 may be selected from the group consisting of the following functional groups, and may be a variety of other aryls or hetero aryls:

wherein R'10 to R'18 are the same as or different from each other, and the others are each independently selected from the group consisting of hydrogen, substituted or unsubstituted, linear or branched alkyl having 1 to 20 carbon atoms, substituted or unsubstituted alkoxy having 1 to 20 carbon atoms, substituted or unsubstituted aryloxy having 6 to 30 carbon atoms, and substituted or unsubstituted aryl having 6 to 40 carbon atoms.

The above described photo-alignment polymer may be a homopolymer containing a single repeating unit of Chemical Formula 3a or 3b, but may be a copolymer containing two or more of the repeating units. The copolymer may contain two or more of the repeating units belonging to the category of Chemical Formula 3a or 3b, but may further contain a vinyl-based repeating unit, an acrylate-based repeating unit, or a polyimide-based repeating unit, in addition to the repeating units of Chemical Formula 3a or 3b. However, considering excellent photo-alignment property of the photo-alignment layer and its excellent interaction with reactive mesogen and liquid crystal alignment property, the copolymer may include approximately 50 mol % or more, approximately 60 mol % or more, or approximately 70 to 100 mol % of the repeating unit of Chemical Formula 3a or 3b.

In the structure of the above described photo-alignment polymer, the detailed definition of each substituent is as follows:

First, the term "alkyl" means a linear or branched, saturated monovalent hydrocarbon of 1 to 20 carbon atoms, preferably 1 to 10 carbon atoms, and more preferably 1 to 6 carbon atoms. The alkyl group may encompass those that are unsubstituted or further substituted with a specific substituent described below. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl or the like.

The term "alkenyl" means a linear or branched, monovalent hydrocarbon of 2 to 20 carbon atoms, preferably 2 to 10 carbon atoms, and more preferably 2 to 6 carbon atoms, which includes one or more carbon-carbon double bonds. The alkenyl group may be bounded through a carbon atom including a carbon-carbon double bond or a saturated carbon atom. The alkenyl group may encompass those that are unsubstituted or further substituted with a specific substituent described below. Examples of the alkenyl group include ethenyl, 1-prophenyl, 2-prophenyl, 2-butenyl, 3-butenyl, pentenyl, 5-hexenyl, dodecenyl or the like.

The term "cycloalkyl" means a saturated or unsaturated non-aromatic monovalent monocyclic, bicyclic, or tricyclic hydrocarbon of 3 to 12 cyclic carbon atoms, and may encompass those that are further substituted with a specific substituent described below. Examples of the cycloalkyl group include cyclopropyl, cyclobutyl, cyclopentyl, cyclopentenyl, cyclohexyl, cyclohexenyl, cycloheptyl, cyclooctyl, decahydronaphtalenyl, adamantyl, norbornyl (e.g., bicyclo [2,2,1] hept-5-enyl) or the like.

The term "aryl" means a monovalent monocyclic, bicyclic, or tricyclic aromatic hydrocarbon having 6 to 40, preferably 6 to 12 cyclic atoms, and may encompass those that are further substituted with a specific substituent described below. Examples of the aryl group may include phenyl, naphthalenyl, fluorenyl or the like.

The term "alkoxyaryl" means that one or more hydrogen atoms of the aryl group defined as described above are substituted with the alkoxy group. Examples of the alkoxyaryl group may include methoxyphenyl, ethoxyphenyl, propoxyphenyl, butoxyphenyl, pentoxyphenyl, heptoxyphenyl, heptoxy, octoxy, nanoxy, methoxybiphenyl, methoxynaphthalenyl, methoxyfluorenyl, methoxyanthracenyl or the like.

The term "aralkyl" means that one or more hydrogen atoms of the alkyl group defined as described above are substituted with the aryl group, and may encompass those that are further substituted with a specific substituent described below. Examples of the aralkyl may include benzyl, benzhydril, tritile or the like.

The term "alkynyl" means a linear or branched, monovalent hydrocarbon of 2 to 20 carbon atoms, preferably 2 to 10 carbon atoms, and more preferably 2 to 6 carbon atoms, which includes one or more carbon-carbon triple bonds. The alkynyl group may be bound through a carbon atom including a carbon-carbon triple bond or a saturated carbon atom. The alkynyl group may encompass those that are further substituted with a specific substituent described below. Examples of the alkynyl group may include ethynyl, propynyl or the like.

The term "alkylene" means a linear or branched, saturated divalent hydrocarbon of 1 to 20 carbon atoms, preferably 1 to 10 carbon atoms, and more preferably 1 to 6 carbon atoms. The alkylene group may encompass those that are further substituted with a specific substituent described below. Examples of the alkylene group may include methylene, ethylene, propylene, butylene, hexylene or the like.

The term "alkenylene" means a linear or branched, divalent hydrocarbon of 2 to 20 carbon atoms, preferably 2 to 10 carbon atoms, and more preferably 2 to 6 carbon atoms, which includes one or more carbon-carbon double bonds. The alkenylene group may be bound through a carbon atom including a carbon-carbon double bond and/or a saturated carbon atom. The alkenylene group may encompass those that are further substituted with a specific substituent described below.

The term "cycloalkylene" means a saturated or unsaturated nonaromatic divalent monocyclic, bicyclic or tricyclic hydrocarbon having 3 to 12 cyclic carbons, and may encompass those that are further substituted with a specific substituent described below. Examples of the cycloalkylene may include cyclopropylene, cyclobutylene or the like.

The term "arylene" means an aromatic divalent monocyclic, bicyclic or tricyclic hydrocarbon having 6 to 20 cyclic atoms, preferably 6 to 12 cyclic atoms, and may encompass those that are further substituted with a specific substituent described below. The aromatic portion of the arylene group includes carbon atoms only. Examples of the arylene group include phenylene or the like.

The term "aralkylene" means a divalent portion in which one or more hydrogen atoms of the alkyl group defined as described above are substituted with the aryl group, and may encompass those that are further substituted with a specific substituent described below. Examples of the aralkylene group may include benzylene or the like.

The term "alkynylene" means a linear or branched, divalent hydrocarbon of 2 to 20 carbon atoms, preferably 2 to 10 carbon atoms, and more preferably 2 to 6 carbon atoms, which includes one or more carbon-carbon triple bonds. The alkynylene group may be bound through a carbon atom including a carbon-carbon triple bond or a saturated carbon atom. The alkynylene group may encompass those that are further substituted with a specific substituent described below. Examples of the alkynylene group may include ethynylene, propynylene and the like.

The above described, "those substituted or unsubstituted with substituents" means that they encompass those further substituted with a specific substituent as well as each substituent itself. Herein, unless otherwise specified, examples of the substituent further substituted in each substituent may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, sillyl or siloxy, or the above described "polar functional group containing oxygen, nitrogen, phosphorous, sulfur, silicon or boron".

The preparation methods of the above described photo-alignment polymer are disclosed in Korean Patent No. 0789247, 0671753 or 0982394, Korean Patent Publication No. 2012-0044883 or 2012-0031912. According to these patent publication documents, when the above described photo-alignment polymer contains the repeating unit of Chemical Formula 3a, the polymer may be prepared by addition polymerization of the monomers of Chemical Formula 2 in the presence of a catalyst composition containing a Group 10 transition metal precatalyst and a cocatalyst so as to form the repeating unit of Chemical Formula 3a:

[Chemical Formula 2]

wherein p and R1 to R4 are the same as defined in Chemical Formula 3a.

Further, if the photo-alignment polymer includes the repeating unit of Chemical Formula 3b, the polymer may be prepared by ring-opening polymerization of the monomers of Chemical Formula 2 in the presence of a catalyst composition containing a Group 4, 6, or 8 transition metal precatalyst and a cocatalyst so as to form the repeating unit of Chemical Formula 3b. Alternatively, the photo-alignment polymer containing the repeating unit of Chemical Formula 3b may be prepared by ring-opening polymerization of the monomer norbornene (alkyl)ol, such as norbornene methanol in the presence of a catalyst composition containing a Group 4, 6, or 8 transition metal precatalyst and a cocatalyst so as to form a ring-opening polymer having a pentagonal ring and to introduce the photoreactive group into the ring-opening polymer.

At this time, introduction of the photoreactive group may be performed by a condensation reaction of the ring-opening polymer with a carboxylic compound having the photoreactive group corresponding to Chemical Formula 1a to 1b or an acyl chloride compound.

In the ring-opening polymerization step, ring-opening may be initiated by adding hydrogens to the double bond in the norbornene ring contained in the monomers of Chemical Formula 2, and at this time, polymerization also occurs to prepare the repeating unit of Chemical Formula 3b and the photoreactive polymer containing the same.

However, the specific preparation process and reaction conditions for the preparation of the photo-alignment polymer are already disclosed in the above described patent publication documents and descriptions thereof will be omitted.

Meanwhile, the photo-alignment layer containing the above described photo-alignment polymer may further include a binder resin in the form of photo-cured crosslinked polymer, and this binder resin may be a (meth)acrylate-based crosslinked polymer. More particularly, the (meth)acrylate-based crosslinked polymer may be crosslinked polymers prepared by photo-curing trifunctional or higher-functional (meth)acrylate-based monomers, and examples thereof may include crosslinked polymers that are prepared by photo-curing one or more multifunctional (meth)acrylate-based monomers selected from the group consisting of pentaerythritol triacrylate, tris(2-acryloyloxyethyl)isocyanurate, trimethylolpropane triacrylate, and dipentaerythritol hexaacrylate.

Further, one or more of the photo-alignment layer and/or the mesogen layer may further include a photoinitiator that is dispersed in the corresponding layer. This photoinitiator initiates and facilitates photo-curing of multifunctional (meth)acrylate-based monomers to form the photo-alignment layer including the binder resin and the photoinitiator, and then remains in the photo-alignment layer. Alternatively, the photoinitiator initiates and facilitates photo-curing of the reactive mesogen to form the mesogen layer on the photo-alignment layer, and then remains in the mesogen layer.

The photoinitiators that are known to initiate and facilitate photo-curing of multifunctional (meth)acrylate-based monomers and/or the reactive mesogen may be used as the photoinitiator. For example, a photoinitiator under the trade name of Irgacure 907 or 819 may be used.

Meanwhile, the above described liquid crystal alignment layer of one embodiment includes the mesogen layer formed on the above described photo-alignment layer, and this mesogen layer may include a cured product (e.g., a cured product having at least partially photo-cured unsaturated group of the reactive mesogen) of the reactive mesogen that is liquid crystal-aligned by the photo-aligned photoreactive group of the photo-alignment layer.

At this time, the reactive mesogen may be any compound that has a mesogenic group showing liquid crystal phase behavior and a photo-polymerizable or photo-curable unsaturated functional group, for example, a vinyl group, a (meth) acryl group or an epoxy group at at least one end thereof. However, considering excellent interaction with the above described photo-alignment polymer and excellent interaction with the liquid crystal molecules of TFT-CELL, the reactive mesogen may be a compound of the following Chemical Formula 4 or 5:

[Chemical Formula 4]

[Chemical Formula 5]

wherein $L_1$ and $L_2$ are each independently selected from the group consisting of hydrogen, halogen, substituted or unsubstituted alkyl having 1 to 20 carbon atoms, substituted or unsubstituted alkyl ester having 1 to 8 carbon atoms, substituted or unsubstituted alkyl ether having 1 to 8 carbon atoms, and substituted or unsubstituted alkyl ketone having 1 to 8 carbon atoms, $B_1$ and $B_2$ are each independently selected from the group consisting of substituted or unsubstituted arylene having 6 to 20 carbon atoms (e.g., phenylene), or substituted or unsubstituted cycloalkylene having 4 to 8 carbon atoms (e.g., cyclohexylene), R1 and R2 are each independently a (meth)acryl group or an epoxy group, $X_1$ is selected from the group consisting of fluorine-substituted or unsubstituted alkyl having 1 to 7 carbon atoms, fluorine-substituted or unsubstituted alkoxy having 1 to 7 carbon atoms, fluorine-substituted or unsubstituted alkenyl having 2 to 7 carbon atoms, fluorine-substituted or unsubstituted alkenyloxy having 2 to 7 carbon atoms, and fluorine-substituted or unsubstituted alkoxyalkyl having 1 to 7 carbon atoms, and $Z_1$, $Z_2$, $Z_3$, and $Z_4$ are each independently a simple bond, —O—, —S—, —COO— or —OCO—.

The reactive mesogen may be applied to the photo-alignment layer after the photo-alignment layer is prepared by at least partially photo-aligning and photo-curing the photoreactive group of the above described photo-alignment polymer to form the binder resin. In addition, the reactive mesogen applied on the photo-alignment layer is liquid crystal-aligned by the photo-aligned photoreactive group, and photo-cured by UV irradiation, and then is included in the mesogen layer of the liquid crystal alignment layer.

The liquid crystal layer of TFT-CELL is liquid crystal-aligned by using the liquid crystal-aligned mesogen layer. As described above, because the reactive mesogen (and cured product thereof) shows more enhanced interaction with the liquid crystal molecules of TFT-CELL, the liquid crystal molecules of TFT-CELL can be more effectively liquid crystal-aligned and image sticking of a liquid crystal display device can be greatly reduced.

Meanwhile, the above described liquid crystal alignment layer of one embodiment may include the photo-alignment layer containing approximately 10 to 50% by weight of the photo-alignment polymer and approximately 5 to 20% by weight of the binder resin; and the mesogen layer containing approximately 40 to 80% by weight of the reactive mesogen cured product, based on the total weight of the liquid crystal alignment layer. A trace amount of the photoinitiator may remain in these photo-alignment layer and/or the mesogen layer, as described above.

Next, the manufacturing method of the above described liquid crystal alignment layer of one embodiment will be described.

In order to form the above described liquid crystal alignment layer, a composition for forming the photo-alignment layer including the above described photo-alignment polymer, and optionally, monomers for forming the binder resin, such as multifunctional (meth)acrylate-based monomers, and the photoinitiator is first applied on a substrate. Each of the components usable in the composition for forming the photo-alignment layer has been already described in detail, and thus additional descriptions thereof will be omitted.

Further, the composition for forming the photo-alignment layer may further include an organic solvent, in order to dissolve each of the above described photo-alignment polymer, monomers for forming the binder resin, and photoinitiator. Examples of the organic solvent may include toluene, xylene, anisole, chlorobenzene, dichloromethane, ethyl acetate, dichloroethane, cyclohexanone, cyclopentanone, N-methylpyrrolidone, butyl cellosolve or propylene glycol methyl ether acetate, and two or more mixtures thereof may be used. In addition, any other solvent may be used depending on the type of the components, in order to effectively dissolve the components and apply them on a substrate.

The above described composition for forming the photo-alignment layer may include approximately 10 to 50% by weight of the photo-alignment polymer, approximately 5 to 20% by weight of the monomers for forming the binder resin, and approximately 0 to 6% by weight of the photoinitiator, based on the total weight of the solid components with the aftermentioned composition for forming the mesogen layer. Further, the aftermentioned composition for forming the mesogen layer may include approximately 40 to 80% by weight of the reactive mesogen, and approximately 0 to 6% by weight of the photoinitiator, based on the total weight of the solid components with the composition for forming the photo-alignment layer. In this regard, the total weight of the solid components may refer to a total weight of the components, excluding the organic solvent from the components constituting the composition for forming the photo-alignment layer and the composition for forming the mesogen layer.

Further, a content of the solid components in the composition for forming the photo-alignment layer and the composition for forming the mesogen layer may be approximately 10 to 80% by weight, thereby providing the preferred coating property of the composition. More particularly, when a thin film is formed from these compositions, the content of the solid components may be approximately 10 to 40% by weight.

When the composition for forming the photo-alignment layer is applied on the substrate, the solution concentration, the solvent type, and the coating method may be determined according to the particular type of the photo-alignment polymer, the monomers for forming the binder resin, and the photoinitiator. However, the coating method may include a roll coating method, a spin coating method, a printing method, an ink jet spraying method, a slit nozzle method or the like. Through this method, the composition may be applied on the substrate that is formed by patterning a transparent conductive layer or a metal electrode.

Additionally, in order to further improve adhesion to the substrate, a functional silane-containing compound, a functional fluorine-containing compound or a functional titanium-containing compound may be applied on the substrate in advance.

As described above, the composition for forming the photo-alignment layer is applied on the substrate, and then the solvent is dried, and UV rays are irradiated to form the photo-alignment layer. In this regard, when photo-irradiation is performed after drying and removing the solvent, the photo-reactive groups of the photo-alignment polymer are at least partially photo-aligned, and the monomers for forming the binder resin is photo-cured to form the binder resin at the same time. Consequently, the photo-alignment layer included in the liquid crystal alignment layer of one embodiment can be formed.

In the step of forming the photo-alignment layer, drying and removal of the solvent may be performed by heating the coated film or by vacuum evaporation. The drying step may be performed at approximately 50 to 200° C. for approximately 30 seconds to 60 minutes, or approximately 100 to 150° C. for approximately 1 minute to 10 minutes.

Further, in the above described photo-irradiation such as UV irradiation, polarized UV rays having a wavelength of approximately 150 to 450 nm may be irradiated on the surface of the dried film. In this regard, the intensity of the UV irradiation may vary depending on the photo-alignment polymer or the type of the photoreactive group, but the energy density of approximately 50 mJ/cm$^2$ to 10 J/cm$^2$, preferably approximately 500 mJ/cm$^2$ to 5 J/cm$^2$, may be irradiated.

The UV rays are subjected to the polarizing treatment by using a method in which UV rays are penetrated through or reflected by (1) a polarizing device using a substrate, in which a dielectric anisotropic material is coated on the surface of the transparent substrate such as quartz glass, sodalime glass, or sodalime-free glass, (2) a polarizing plate on which aluminium or metal wire is finely deposited, or (3) a Bruster polarizing device using reflection by quartz glass. At this time, the polarized UV rays may be irradiated on the composition of the substrate. The polarized UV rays may be irradiated in a direction that is vertical to the surface of the substrate, or may be irradiated at a predetermined incident angle.

Further, the substrate temperature, when UV rays are irradiated, may be around room temperature. However, according to circumstances, UV rays heated to a temperature of approximately 100° C. or less may be irradiated.

The photo-alignment layer is formed by the above described method, and then the composition for forming the mesogen layer including the reactive mesogen and optionally photoinitiator is applied on the photo-alignment layer, and then photo-irradiation such as UV irradiation is subjected thereto to form the mesogen layer. The composition may further include an organic solvent, in order to dissolve each of the components of the reactive mesogen and photoinitiator, and the type of the organic solvent may be the same as those used in the composition for forming the photo-alignment layer. In addition, the content of each component of the composition for forming the mesogen layer, for example, reactive mesogen and photoinitiator, and the content of the solid components thereof have been already described, and descriptions thereof will be omitted.

When the composition for forming the mesogen layer is applied on the photo-alignment layer, and optionally, the solvent is dried and removed, and then photoirradiation is performed, the reactive mesogen can be liquid crystal-align along the photo-aligned photoreactive group included in the photo-alignment layer, and the unsaturated group of the reactive mesogen is photo-cured at the same time to form the mesogen layer. In the process of forming the mesogen layer, the step of drying and removing the solvent can be performed by heating the coated film or by vacuum evaporation, as in the process of forming the photo-alignment layer. The drying step may be performed at approximately 50 to 200° C. for approximately 30 seconds to 60 minutes, or at approximately 50 to 100° C. for approximately 30 seconds to 5 minutes.

Further, the specific method and conditions of the photoirradiation step for forming the mesogen layer are performed in accordance with the above described method and conditions for forming the photo-alignment layer or in accordance with the typical method and conditions for liquid crystal-aligning or photocuring the reactive mesogen.

Additionally, the liquid crystal alignment layer formed by the above described method may have a thickness of approximately 30 to 200 nm, or approximately 50 to 200 nm. In addition, the liquid crystal alignment layer may further include the liquid crystal layer on the mesogen layer, for example, the liquid crystal layer of TFT-CELL. This liquid crystal layer may include, for example, any liquid crystal molecules used in the liquid crystal layer of TFT-CELL.

The above described liquid crystal alignment layer allows interaction between the cured product of the liquid crystal-aligned reactive mesogen included in the mesogen layer and the liquid crystal layer of TFT-CELL, thereby liquid crystal-aligning the liquid crystals of TFT-CELL. Consequently, interaction (anchoring energy) between the liquid crystal alignment layer and the liquid crystal layer of TFT-CELL can be more improved to reduce image sticking of a liquid crystal display device, to exhibit excellent liquid crystal alignment and alignment speed characteristics of the photopolymerizable liquid crystal alignment layer, and furthermore, to realize high contrast ratio of the liquid crystal display device and wide viewing angle due to multidirectional pattern of the liquid crystals.

Meanwhile, according to another embodiment of the present invention, provided is a liquid crystal cell including the above described liquid crystal alignment layer of one embodiment. This liquid crystal cell may include the substrate and the liquid crystal alignment layer formed on the substrate. The liquid crystal cell may be manufactured according to the typical method known in the art. For example, after a photoreactive adhesive including a ball spacer is applied on ends of any one glass substrate of two glass substrates having the liquid crystal alignment layer, the other glass substrate is attached thereto, UV rays are irradiated on the adhesive-applied portion, and the cell is attached thereto. Subsequently, the liquid crystal is injected into the manufactured cell and is subjected to heat treatment, thereby manufacturing the liquid crystal cell.

This liquid crystal cell may be a typical liquid crystal cell, for example, an IPS (In-Plane Switching) liquid crystal cell or a TN (Twisted-Nematic) liquid crystal cell.

This liquid crystal cell is able to exhibit excellent liquid crystal alignment stability and lower image sticking, and also to exhibit excellent liquid crystal alignment property, high contrast ratio, or the like.

Effect of the Invention

The present invention provides a liquid crystal alignment layer that is able to more effectively enhance interaction (anchoring energy) between a liquid crystal alignment layer and a liquid crystal layer of TFT-CELL, and to reduce image sticking of a liquid crystal display device, and a liquid crystal cell including the same. The liquid crystal alignment layer of the present invention is able to exhibit excellent liquid crystal alignment and alignment speed characteristics of the photopolymerizable liquid crystal alignment layer, and to reduce image sticking of the liquid crystal display device by solving the problems of the conventional photopolymerizable liquid crystal alignment layer, and furthermore, to maintain excellent contrast ratio and to realize wide viewing angle due to multidirectional pattern of the liquid crystals.

Hereinafter, the preferred Examples are provided for better understanding. However, these Examples are for illustrative purposes only, and the invention is not intended to be limited by these Examples.

EXAMPLE 1

Manufacture of Liquid Crystal Alignment Layer

Poly(2-(4-fluoro cinnamic ester)-5-norbornene obtained in Examples 1 and 6 of Korean Patent No. 0982394 was used as a photo-alignment polymer. 2% by weight of the photo-alignment polymer, 1% by weight of pentaerythritol triacrylate as a binder resin, and 0.125% by weight of the photoinitiator Irgacure 907 manufactured by Ciba were dissolved in an organic solvent to form a composition for forming a photo-alignment layer. At this time, a solvent mixture of 40 to 80% by weight of cyclopentanone or N-methylpyrrolidone and 20 to 60% by weight of butylcellosolve was used as the organic solvent. The composition for forming the photo-alignment layer was applied on an ITO substrate or TFT (thin film transistor) substrate by spin-coating (1000 to 1500 rpm, 20 sec), and dried at 100° C. for 2 minutes. Then, a light of 15 mw/cm$^2$ was irradiated using a UV irradiator (UV-A, UV-B) for 2 minutes to manufacture a liquid crystal alignment layer. At this time, UV irradiation was performed by disposing a polarizing plate in front of a UV lamp.

RMM907 (RM1) manufactured by Merck was used as the reactive mesogen, and 5% by weight of the reactive mesogen and 0.125% by weight of the photoinitiator were dissolved in an organic solvent to form a composition for forming a mesogen layer. At this time, a solvent mixture of 40 to 80% by weight of cyclopentanone or N-methylpyrrolidone and 20 to 60% by weight of butylcellosolve was used as the organic solvent. The solution for forming the mesogen layer was applied on an ITO substrate or TFT substrate, on which the photo-alignment layer is formed, by spin-coating (1000 to 1500 rpm, 20 sec), and dried at 100° C. for 2 minutes. Then, a light of 15 mw/cm$^2$ was irradiated using a UV irradiator (UV-A, UV-B) for 2 minutes to manufacture a mesogen layer. At this time, UV irradiation was performed by disposing a polarizing plate in front of a UV lamp.

EXAMPLE 2

Manufacture of Liquid Crystal Alignment Layer

A liquid crystal alignment layer including a photo-alignment layer and a mesogen layer was formed in the same manner as in Example 1, except using poly(2-(4-methoxy cinnamic ester)-5-norbornene instead of poly(2-(4-fluoro cinnamic ester)-5-norbornene as the photo-alignment polymer.

EXAMPLE 3

Manufacture of Liquid Crystal Alignment Layer

A liquid crystal alignment layer including a photo-alignment layer and a mesogen layer was formed in the same manner as in Example 1, except using poly(2-(4-benzyloxy cinnamic ester)-5-norbornene instead of poly(2-(4-fluoro cinnamic ester)-5-norbornene as the photo-alignment polymer.

EXAMPLE 4

Manufacture of Liquid Crystal Alignment Layer

A liquid crystal alignment layer including a photo-alignment layer and a mesogen layer was formed in the same manner as in Example 1, except using poly(2-(4-bromine cinnamic ester)-5-norbornene instead of poly(2-(4-fluoro cinnamic ester)-5-norbornene as the photo-alignment polymer.

EXAMPLE 5

Manufacture of Liquid Crystal Alignment Layer

A liquid crystal alignment layer including a photo-alignment layer and a mesogen layer was formed in the same manner as in Example 1, except using RMM1057 manufactured by Merck instead of RMM907 manufactured by Merck as the reactive mesogen.

EXAMPLE 6

Manufacture of Liquid Crystal Alignment Layer

A liquid crystal alignment layer including a photo-alignment layer and a mesogen layer was formed in the same manner as in Example 1, except using LC1057 manufactured by BASF instead of RMM907 manufactured by Merck as the reactive mesogen.

COMPARATIVE EXAMPLE 1

Manufacture of Liquid Crystal Alignment Layer

A photo-alignment layer was formed in the same manner as in Example 1, and used as a liquid crystal alignment layer of Comparative Example 1, and no mesogen layer was formed on the photo-alignment layer.

COMPARATIVE EXAMPLE 2

Manufacture of Liquid Crystal Alignment Layer

The same photo-alignment polymer and reactive mesogen as used in the Example 1 were used. These photo-alignment polymer and the reactive mesogen were used in an amount of 2% by weight and 5% by weight, respectively, and 1% by weight of pentaerythritol triacrylate as the binder resin and 0.125% by weight of the photoinitiator Irgacure 907 manufactured by Ciba were dissolved together with the photo-alignment polymer and the reactive mesogen in an organic solvent so as to form a composition for a liquid crystal alignment layer.

At this time, a solvent mixture of 40 to 80% by weight of cyclopentanone or N-methylpyrrolidone and 20 to 60% by weight of butylcellosolve was used as the organic solvent. The composition for the liquid crystal alignment layer was applied on an ITO substrate or TFT (thin film transistor) substrate by spin-coating (1000 to 1500 rpm, 20 sec), and dried at 100° C. for 2 minutes. Then, a light of 15 mw/cm$^2$ was irradiated using a UV irradiator (UV-A, UV-B) for 2 minutes to manufacture a liquid crystal alignment layer. At this time, UV irradiation was performed by disposing a polarizing plate in front of a UV lamp.

COMPARATIVE EXAMPLE 3

Manufacture of Liquid Crystal Alignment Layer

A liquid crystal alignment layer including a photo-alignment layer and a mesogen layer was formed in the same manner as in Example 1, except using polyvinyl cinnamate instead of poly(2-(4-fluoro cinnamic ester)-5-norbornene as the photo-alignment polymer.

EXPERIMENTAL EXAMPLE

Manufacture of Liquid Crystal Cell and Evaluation of Initial Black Luminance and Image Sticking Characteristics A 3 μm spacer-containing sealant was used to attach the liquid crystal alignment layer substrates manufactured in Examples 1 to 6 and Comparative Examples 1 to 3, and the sealant was cured with UV. IPS liquid crystal was injected via capillary force. The liquid crystal-injected cell was stabilized at 80° C. for 20 minutes, and polarizing plates were attached to the upper and lower surfaces of the cell in cross. Then, initial black luminance was measured using a photometer. The results of measuring the initial black luminance are shown in the following Table 1. The rubbing alignment was performed using a polyimide-based alignment polymer, and its initial black luminance was also measured and shown in Table 1 as Reference Example 1.

According to the results of measuring the initial black luminance of Table 1, the black luminances of Examples 1 to 6 were similar to that of Reference Example 1.

In the measurement and evaluation of image sticking characteristic, initial black luminances of the cells manufactured as above were first measured, and then an electric field of 60 Hz was applied to the same surface to give stress at 60° C. for 15 hours. Then, black luminance was measured again, and the increased black luminance relative to the initial black luminance was defined as a luminance increasing ratio. The luminance increasing ratio was measured over time after giving stress, and shown in FIGS. 1 and 2. For reference, when the luminance increasing ratio is 0.4 or less, it can be evaluated as loss of image sticking, and image sticking characteristic is evaluated as excellent. The loss of image sticking was also evaluated by visual inspection for evaluating the image sticking characteristic.

Figure 1:
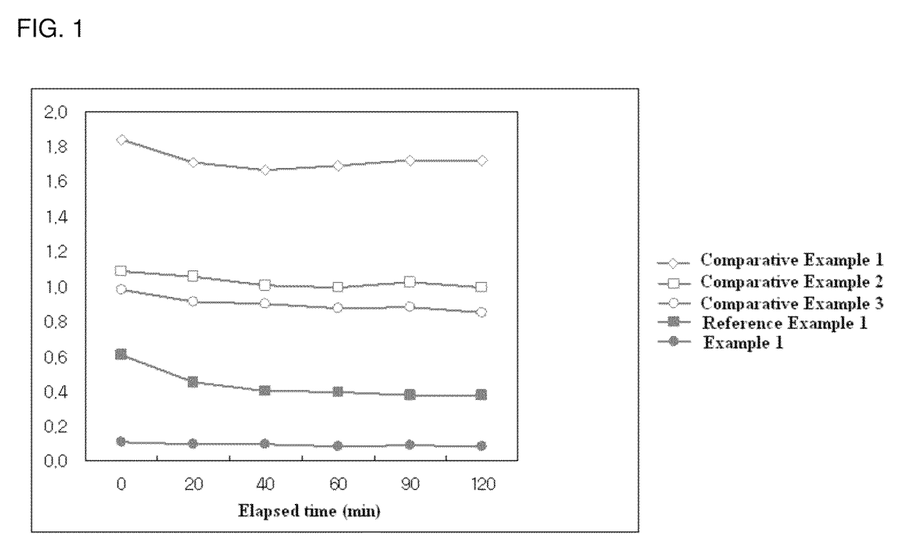
FIG. 1 is a graph showing the result of measuring the luminance increasing ratio over time in order to evaluate image sticking characteristics of Example 1, Comparative Examples 1 and 2, and Reference Example 1 in Experimental Example.
Figure 2:
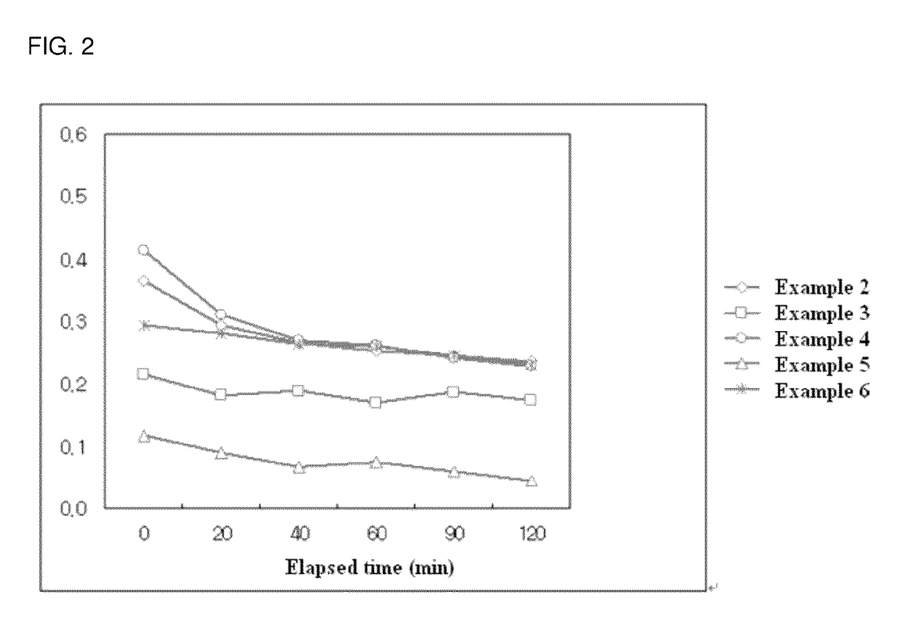
FIG. 2 is a graph showing the result of measuring the luminance increasing ratio over time in order to evaluate image sticking characteristics of Examples 2 to 6 in Experimental Example.

Referring to FIGS. 1 and 2, when the liquid crystal alignment layers of Examples 1 to 6 were used, the black luminances were recovered even after removing stress in the similar level to those before giving initial stress, indicating very excellent image sticking characteristic. Such a low luminance increasing ratio suggests that very excellent alignment stability can be obtained by use of the liquid crystal alignment layers of Examples 1 to 6.

In contrast, when the liquid crystal alignment layers of Comparative Examples 1 to 3 were used, high luminance increasing ratio, in particular, exceeding 0.4 was observed, indicating poor image sticking characteristic and low alignment stability. Reference Example 1 of the rubbing alignment process, which is known to exhibit excellent image sticking characteristic compared to the photopolymerizable alignment layer, was also found to exhibit poor image sticking characteristic and low alignment stability, compared to Examples 1 to 6.

TABLE 1

Measurement of initial black luminance

| | Initial black luminance |
|---|---|
| Example 1 | 2.94 |
| Example 2 | 2.81 |
| Example 3 | 3.33 |
| Example 4 | 2.38 |
| Example 5 | 2.78 |
| Example 6 | 3.47 |
| Comparative Example 1 | 3.39 |
| Comparative Example 2 | 2.88 |
| Comparative Example 3 | 3.52 |
| Reference Example 1 | 2.82 |

What is claimed is:

1. A liquid crystal alignment layer, comprising
a photo-alignment layer including a photo-alignment polymer having at least partially photo-aligned photoreactive group; and
a mesogen layer including a cured product of a reactive mesogen that is liquid crystal-aligned by the photo-aligned photoreactive group,
wherein the photo-alignment polymer includes a norbornene-based polymer having a repeating unit of the following Chemical Formula 3a or 3b:

[Chemical Formula 3a]

[Chemical Formula 3b]

wherein each independently, q is an integer of 0 to 4, r is an integer of 1 to 4, and m is 50 to 5000, and
one or more of R1, R2, R3, and R4 are a radical of the following Chemical Formula 1a,
R1 to R4 other than those being the radical of Chemical Formula 1a are the same as or different from each other, and each independently selected from the group consisting of hydrogen; halogen; substituted or unsubstituted, linear or branched alkyl having 1 to 20 carbon atoms; substituted or unsubstituted, linear or branched alkenyl having 2 to 20 carbon atoms; substituted or unsubstituted, linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group containing one or more selected from oxygen, nitrogen, phosphorous, sulfur, silicon and boron,
if R1 to R4 are not hydrogen; halogen; or a polar functional group, one or more combinations selected from the group consisting of R1 and R2, and R3 and R4 are optionally linked to each other to form an alkylidene group having 1 to 10 carbon atoms, or R1 or R2 is optionally linked to any one of R3 and R4 to form a saturated or unsaturated aliphatic ring having 4 to 12 carbon atoms or an aromatic ring having 6 to 24 carbon atoms,

[Chemical Formula 1a]

wherein A is a simple bond, oxygen, sulfur, or —NH—,
B is selected from the group consisting of a simple bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms,
R9 is selected from the group consisting of a simple bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms, and
R10 to R14 are the same as or different from each other, and each independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, substituted or unsubstituted alkoxyaryl having 6 to 40 carbon atoms, and hetero aryl having 6 to 40 carbon atoms containing a hetero element of Group 14, 15 or 16.

2. The liquid crystal alignment layer according to claim 1, wherein one or more of R10 to R14 are halogen, substituted or unsubstituted alkoxy having 1 to 20 carbon atoms, substituted or unsubstituted aryloxy having 6 to 30 carbon atoms, substituted or unsubstituted aryl having 6 to 40 carbon atoms, substituted or unsubstituted alkoxyaryl having 6 to 40 carbon atoms, or halogen-substituted or unsubstituted alkyl having 1 to 20 carbon atoms.

3. The liquid crystal alignment layer according to claim 1, wherein the reactive mesogen has a mesogenic group and a photo-polymerizable or photo-curable functional group at one or more ends thereof.

4. The liquid crystal alignment layer according to claim 1, wherein the reactive mesogen includes a compound of the following Chemical Formula 4 or 5:

[Chemical Formula 4]

[Chemical Formula 5]

wherein L1 and L2 are each independently selected from the group consisting of hydrogen, halogen, substituted or unsubstituted alkyl having 1 to 20 carbon atoms, substituted or unsubstituted alkyl ester having 1 to 8 carbon atoms, substituted or unsubstituted alkyl ether having 1 to 8 carbon atoms, and substituted or unsubstituted alkyl ketone having 1 to 8 carbon atoms, $B_1$ and $B_2$ are each independently substituted or unsubstituted arylene having 6 to 20 carbon atoms, or substituted or unsubstituted cycloalkylene having 4 to 8 carbon atoms, R1 and R2 are each independently a (meth)acryl group or an epoxy group, $X_1$ is selected from the group consisting of fluorine-substituted or unsubstituted alkyl having 1 to 7 carbon atoms, fluorine-substituted or unsubstituted alkoxy having 1 to 7 carbon atoms, fluorine-substituted or unsubstituted alkenyl having 2 to 7 carbon atoms, fluorine-substituted or unsubstituted alkenyloxy having 2 to 7 carbon atoms, and fluorine-substituted or unsubstituted alkoxyalkyl having 1 to 7 carbon atoms, and $Z_1$, $Z_2$, $Z_3$, and $Z_4$ are each independently a simple bond, —O—, —S—, —COO— or —OCO—.

5. The liquid crystal alignment layer according to claim 1, wherein the photo-alignment layer further includes a binder resin in the form of photo-cured crosslinked polymer.

6. The liquid crystal alignment layer according to claim 5, wherein the binder resin includes a (meth)acrylate-based crosslinked polymer.

7. The liquid crystal alignment layer according to claim 6, wherein the (meth)acrylate-based crosslinked polymer is a crosslinked polymer that is prepared by photo-curing one or more multifunctional (meth)acrylate-basedmonomers selected from the group consisting of pentaerythritol triacrylate, tris(2-acryloyloxyethyl)isocyanurate, trimethylolpropane triacrylate, and dipentaerythritol hexaacrylate.

8. The liquid crystal alignment layer according to claim 1, wherein the photo-alignment layer or the mesogen layer further includes a photoinitiator dispersed in the corresponding layer.

9. The liquid crystal alignment layer according to claim 5, comprising
the photo-alignment layer including 10 to 50% by weight of the photo-alignment polymer and 5 to 20% by weight of the binder resin; and
the mesogen layer including 40 to 80% by weight of the reactive mesogen cured product, based on the total weight of the liquid crystal alignment layer.

10. The liquid crystal alignment layer according to claim 1, further comprising a liquid crystal layer comprising TFT-CELL liquid crystal molecule on the mesogen layer.

11. The liquid crystal alignment layer according to claim 1, having a thickness of 30 to 200 nm.

12. A liquid crystal cell comprising the liquid crystal alignment layer of claim 1 or 10.

13. The liquid crystal cell according to claim 12, wherein the liquid crystal cell is an IPS (In-Plane Switching) liquid crystal cell.

14. The liquid crystal cell according to claim 12, wherein the liquid crystal cell is a TN (Twisted-Nematic) liquid crystal cell.

* * * * *